United States Patent [19]

Truchet

[11] Patent Number: 5,606,345
[45] Date of Patent: Feb. 25, 1997

[54] DISPLAY AND INPUT CONTROL DEVICE

[76] Inventor: Philippe Truchet, 37 Square Anatole France, 91250 Saint Germain Les Corbeil, France

[21] Appl. No.: 256,577

[22] PCT Filed: Nov. 16, 1992

[86] PCT No.: PCT/FR92/01065

§ 371 Date: Jul. 29, 1994

§ 102(e) Date: Jul. 29, 1994

[87] PCT Pub. No.: WO94/11803

PCT Pub. Date: May 26, 1994

[51] Int. Cl.⁶ .............................. G06F 3/033; G06F 3/023
[52] U.S. Cl. ................................. 345/119; 34/113; 34/118; 34/120; 34/146; 34/168; 34/173; 34/902
[58] Field of Search ................................. 345/168, 173, 345/146, 902, 118, 113, 119, 120

[56] References Cited

U.S. PATENT DOCUMENTS

| | | | |
|---|---|---|---|
| 4,779,135 | 10/1988 | Judd | 358/183 |
| 4,896,290 | 1/1990 | Rhodes et al. | 370/85.13 |
| 5,001,704 | 3/1991 | Narup et al. | 370/85.13 |
| 5,003,505 | 3/1991 | McClelland | 364/900 |
| 5,031,119 | 7/1991 | Dulaney et al. | 345/119 |
| 5,214,421 | 5/1993 | Vernon et al. | 340/825.03 |
| 5,367,628 | 11/1994 | Ote et al. | 345/119 |
| 5,410,305 | 4/1995 | Barrus et al. | 341/22 |
| 5,414,422 | 5/1995 | Allen | 341/22 |
| 5,542,069 | 7/1996 | Meppelink et al. | 345/119 |

FOREIGN PATENT DOCUMENTS

| | | | |
|---|---|---|---|
| 0395469 | 10/1990 | European Pat. Off. | 345/119 |
| WO92/09037 | 5/1992 | WIPO | 345/119 |

OTHER PUBLICATIONS

G. P. Patch et al, "Touch Panel Attachment to CRT Using Light Pen Interface," *IBM Technical Disclosure Bulletin*, v. 26, No. 5, Oct. 1983.

*Primary Examiner*—Mark R. Powell
*Assistant Examiner*—Kuniki C. Lockett
*Attorney, Agent, or Firm*—Oliff & Berridge

[57] ABSTRACT

An electronic device that simplifies a use of a data processing system. The electronic device displays on a data processing system display device either data from the data processing system or data generated by the electronic device. The electronic device displays data on the display device to allow entry of data to the data processing system by using a touch sensitive screen placed over the display device. The operation of the electronic device is achieved without modification of the data processing system or application software executing in the data processing system.

11 Claims, 2 Drawing Sheets

DISPLAY AND INPUT CONTROL DEVICE

BACKGROUND OF THE INVENTION

1. Field of the Invention The present invention relates to a device designed to simplify the use of a computing system.

2. Description of Related Art

A computing system such as a microcomputer comprises of a central microprocessing unit and a keyboard for command and data input.

To facilitate the use of either computing systems, use of a tactile keyboard covering the screen serving as the point at which the user intervenes directly by pointing a finger, or a specific command device, depending on the type of tactile keyboard concerned, is widely known. However, such a system either does not have an independent command keyboard, or the system is specifically designed to function with a tactile keyboard, which must be taken into consideration by the applications processed by the system.

SUMMARY OF INVENTION

One object of the invention is to furnish a device which simplifies the use of a computing system by implementing a tactile keyboard at the screen. This device is simple in design and allows the appearance of command windows superimposed over the current application, display without modifications to the application.

To this end, the device generates windows superimposed over the current application display and receives inputs from a tactile screen covering the computer screen. The device comprises at least one central microprocessing unit (CPU including CPV RAM and ROM memories, one RAM memory for window position, one RAM memory for data to be displayed in the windows, a keyboard interface designed to be connected to the keyboard connector of the computer, a peripheral circuit to drive the tactile keyboard, and an electronic switching system allowing the device to be situated between the computer screen connector and the screen in such a way that for selecting in real time the source of the data to be displayed, from either a keyboard or a tactile keyboard.

This device allows the inserting of a display window on the viewing screen of the computing system completely independently of the application that is running without needing to modify or intervene in any way with the hardware of the computing system or the software running on the system. The window inset by the device according to the invention may also be broken up into multiple windows, each one corresponding to the display part of the device.

This window or windows may, for example, be used for simultaneous display of an application running in parallel with the current main application on the computing system to which the device is connected.

The inset mode will always be graphic. In other words, the inserting is not dependent on the display mode, either character or graphics, used by the system to which the device is connected.

The device, according to the invention, thus permits the sharing of a computing system display screen between the main application and a second application, which may be generated by two independent electronic systems, and displaying the results and/or information of both applications on the same screen. The screen is displayed so that the main application is not aware of this screen sharing. The device thus allows the superimposition over the display of the main application of the screen of the second application. Furthermore, the device allows interaction with the main application while still preserving the integrity of the second application.

The device is able to provide input of information to the second application as if it had been input on the computing system keyboard (simulation of the input device).

The device also allows for the attachment of a single input tactile keyboard that covers the computing system screen and acts as a substitute for the mechanical keyboard and/or other input and/or pointing devices (mouse, trackball, etc.) usually connected to these computing systems.

The computing system has access to the screen, keyboard and data bus in the form of connectors. The device, according to the invention, uses this access and no modification is necessary to the existing access.

According to the particular embodiments the device may be in an independent housing with its own power supply, or the device may be inserted into an existing system, as a bus extension card. The device may also be used during the design phase for a microcomputer host or other type of computing system.

It should be noted that the tactile keyboard is considered here as an example of a possible peripheral device which combines with the host computer system in an efficient manner with to make applications more user-friendly. Any other input peripheral may be cited in its place, such as a microcomputing mouse, a digitizing tablet, a trackball, etc.

Each of these peripherals may be used as an input into by the device, the latter transforming the actions of all types of peripherals into keystrokes sent to the first computer.

The technology comprises insetting of windows and simulating the physical presence of a keyboard implementation of keyboard emulation software allowing the transformation of data originating from diverse peripheral tools into data sent to the host computer.

According to one embodiment of the invention, this device includes a driving unit for the tactile keyboard, a keyboard interface to the host computer. The central processing unit transforms the information from the touch on the tactile keyboard into standard keyboard data sent to the computer.

Advantageously, the central processing unit is able to generate the preprogrammed consecutive sequences of keystrokes sent to the computer.

In addition, since the tactile keyboard covers the computer screen, the central processing unit is able to link the display windows of the device, the touch on the tactile keyboard, and the corresponding keystrokes, generated to the computer.

BRIEF DESCRIPTION OF THE DRAWINGS

The invention will be readily understood, with the help of the following description, referring to the attached schematic drawing which represents, as a nonlimiting example, one embodiment of this device, in which.

DETAILED DESCRIPTION OF PREFERRED EMBODIMENT

Figure 1:
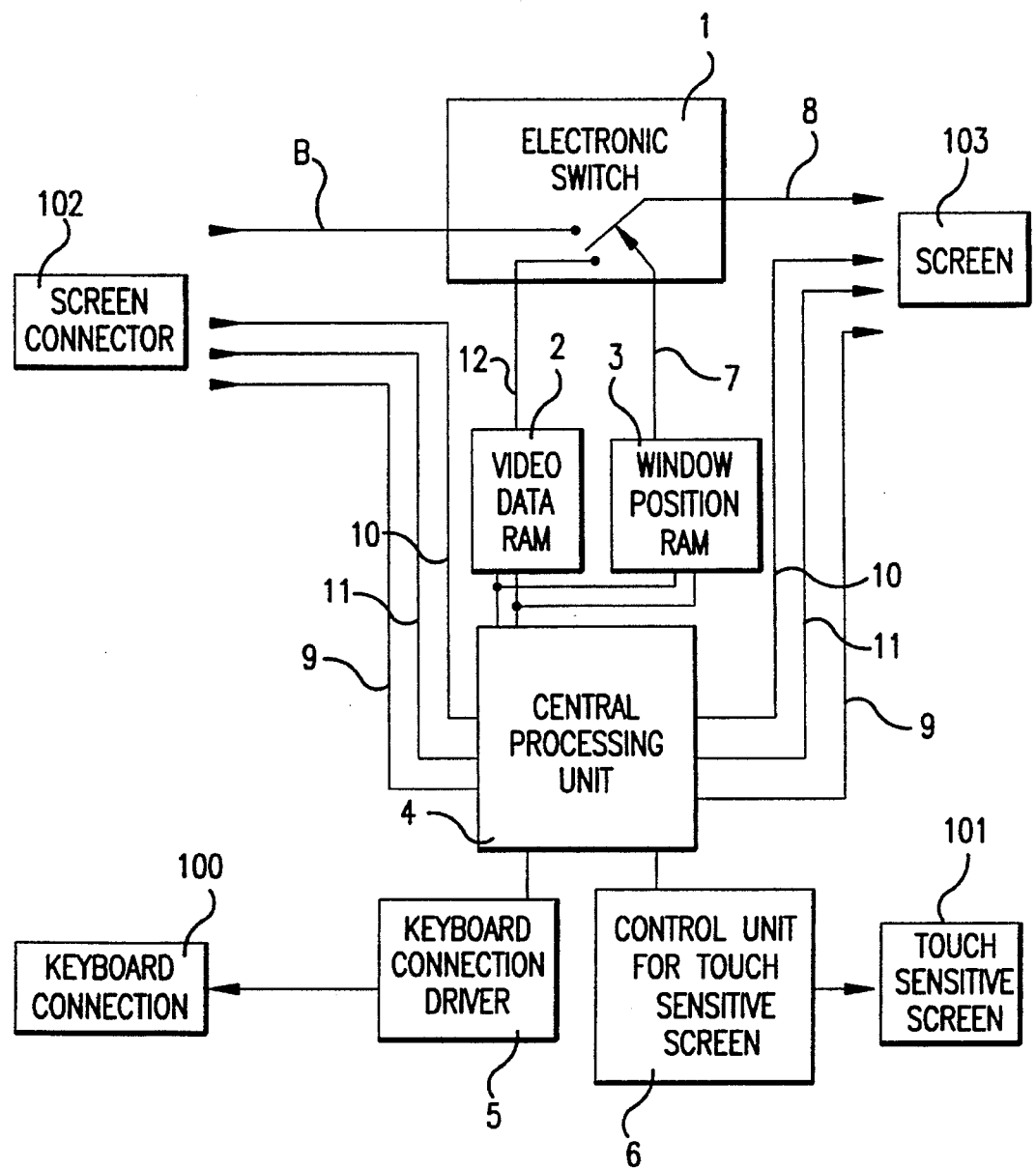
FIG. 1 is a block diagram of the data and input control device.

FIG. 1 shows a device according to the invention in which the principal signals used originating from screen connector 102 of the computer include synchro frame 10, which is a screen refresh signal, synchro line 11, which is a beginning of line signal, data validation 9, which validates the data present on data bus 8, and data bus, which supplies the data to be displayed on the screen.

Block 1 represents an electronic switch allowing the selection for display on the screen of either the data 8 originating from the host computer, or the data 12 to be inset on the screen by the device. This switch may take the form of standard buffers, for example type 244. Block 2 represents the video RAM (memory) in which the data to be inset are stored. Block 3 represents RAM (memory) containing the image of the position of the window or windows to be inset on the screen, the corresponding data bits activating the switching of block 1.

Block 4 is a central microprocessing and which includes it's associated working RAM memory and ROM memory, which allows the driving of the device and in particular, calculation of the screen address where the current data found on the data bus will be displayed. This address is calculated from the synchro frame and the synchro line information, the filling of memories 2 and 3, the driver 6 for tactile keyboard 101 and the driver 5 for keyboard connection 100 to the computer.

An LCD screen may present different resolution types, for example 640 horizontal resolution points and 200, 400, 480 points vertically (non exhaustive).

The device functions regardless of the screen resolution, the horizontal and vertical resolution parameters being programmable manually or through software residing in the central processing unit of the device.

A screen is thus characterized by its "multiplexing rate". This parameter gives information on how the screen will be refreshed, either as a single screen or as two half-screens.

A last parameter is the width of the screen data bus, in general for screens of sufficient resolution (640 ×200), the data bus is 4 bits wide or 8 bits wide broken down into two times 4 bits if the multiplexing rate is half the vertical resolution.

Example: a screen with a resolution of 640 ×400 with a multiplexing rate of ½₀₀ will be refreshed in two half screens, each half screen being accessed simultaneously by a 4 bit bus assigned to each half screen.

All of these parameters may be taken into account by the device in different ways, such as by positioning of the microswitches, software programming with downloading of the screen type, etc.

Depending on the value of these parameters, the central processing unit will account for the type of screen used no matter what it's type. The principal of functionality for the device remains the same. We will hereinafter assume a screen with a resolution 640×400 with a multiplexing rate of ¼₀₀ (thus refreshing in a linear manner) and having a data bus 8 bits wide.

As shown in FIG.1, following the generation of the frame pip signal, the first value appearing on data bus 8 and validated by data validation signal 9 corresponds to the first eight pixels at the upper left corner of the screen. The ensuing values will thus sweep the entire screen, line by line. In this case, the device will be able to inset the windows placed on the screen in a position in multiples of eight pixels on the horizontal.

With a four bit bus, the position resolution of the window or windows would be four pixels horizontally, the vertical placement resolution remains to be the pixel. The data bus being eight bits, the screen having a resolution of 640 points horizontally and the eight data bits corresponding to eight horizontal pixels, the result for each line is: $^{640}\!/_8\!=\!80$ times the data validation signal for the display of a horizontal line.

The devices awaits, to begin its cycle, the synchronization pip generated by the synchro frame signal 10 marking the beginning of a complete refresh of the screen. This synchro frame pip initializes a counter in block 4 whose goal is to transform into a binary value the number of "data validation" signals which have appeared since this synchronization frame pip. The binary value, fifteen bits for the current example, is input to the RAM block 3 as well to the RAM block 2 as address.

The data corresponding to the address thus presented on this RAM block 3 by the block 4 counter will allow switch I to be controlled by the control 7. Thus, according to the value of this data, one of the following is moved via the data bus to the screen, either the current value, on the data bus originating from the lost computer (for example, data=0 in RAM 3), or the current value at this moment on the data bus in RAM block 2 (data = 1 in RAM 3). The RAM 2 and 3 is programmed in advance by the central processing unit of the device by opening a window on the screen at the position delimited by X1Y1-X2Y2-X3Y3-X4Y4, where X represents the horizontal coordinates and Y represents the vertical coordinates. The values for X, for the current screen example with an eight bit data bus, should thus be in multiples of eight, for 640 horizontal pixels, included between 0 and 79. The Y Values are included, for this screen, between 0 and 399 (400 pixels of vertical resolution).

The data values contained in RAM 2 and RAM 3 are organized as data values on the screen. For RAM 2, containing the data values to be displayed in inset mode on the screen, these values are programmed into RAM at the addresses corresponding to the place where they should be displayed. When the first value to be displayed is found in position X1Y1 on the screen, the address where this value can be found in RAM 2 will be (X1×λ) +Y1.

In FIG.1, the electronic switch 1 is controlled by the data contained at this same address in RAM 3, via control 7. Here for example, a value of 1 switches block no. 1 towards the data captured in RAM 2. RAM block 2 will be programmed by data corresponding to the pixels to be displayed between the addresses:

---

(X1 × 80) + Y1 to (X1 × 80) + Y2
[(X1 + 1) × 80] + Y1 to [(X1 + 1) × 80] + Y2
[(5X1 + 2) × 80] + Y1 to [(X1 + 2) × 80] + Y2
"
"
(X2 × 80) + Y1 to (X2 × 80) + Y2

---

In the same way, in the same address area, RAM 3 contains bit value "0" or "1" controlling block no.1 to switch between the host computer and the contents of RAM 2 respectively when these addresses are accessed by block 4. These addresses are created by the screen control signals and thus correspond to the data position on the screen currently being treated.

The device according to the invention may be used, for example with a PC type microcomputer as the host computer. The device according to the invention is connected to the host computer by means of keyboard connector 100 and screen connector 102 of said microcomputer. An analog tactile keyboard covers the screen of the host computer, is connected in 101 to the device.

The device takes the information originating from the host computer keyboard and from the tactile keyboard and retransmits them to the host computer as if only the host computer keyboard had been connected. The touch on the tactile keyboard is transformed by the device into "keyboard" data and presented as such to the host computer by means of the keyboard connector to the host computer.

In case of use of a resistive tactile keyboard, the control unit for tactile keyboard 6 includes an analog-to-digital converter with two input channels allowing the conversion of analog values on the X and Y axis furnished by the tactile keyboard into numeric values usable by the central processing unit 4 of FIG.1. The central processing unit deduces by simple calculation the position of the touch in absolute coordinates. An internal correspondence table in the central processing unit then allows the software in the central processing unit to send the corresponding keyboard codes to the host computer. The actions on the real keyboard are retransmitted as they are to the host computer by means of the device.

Figure 2:
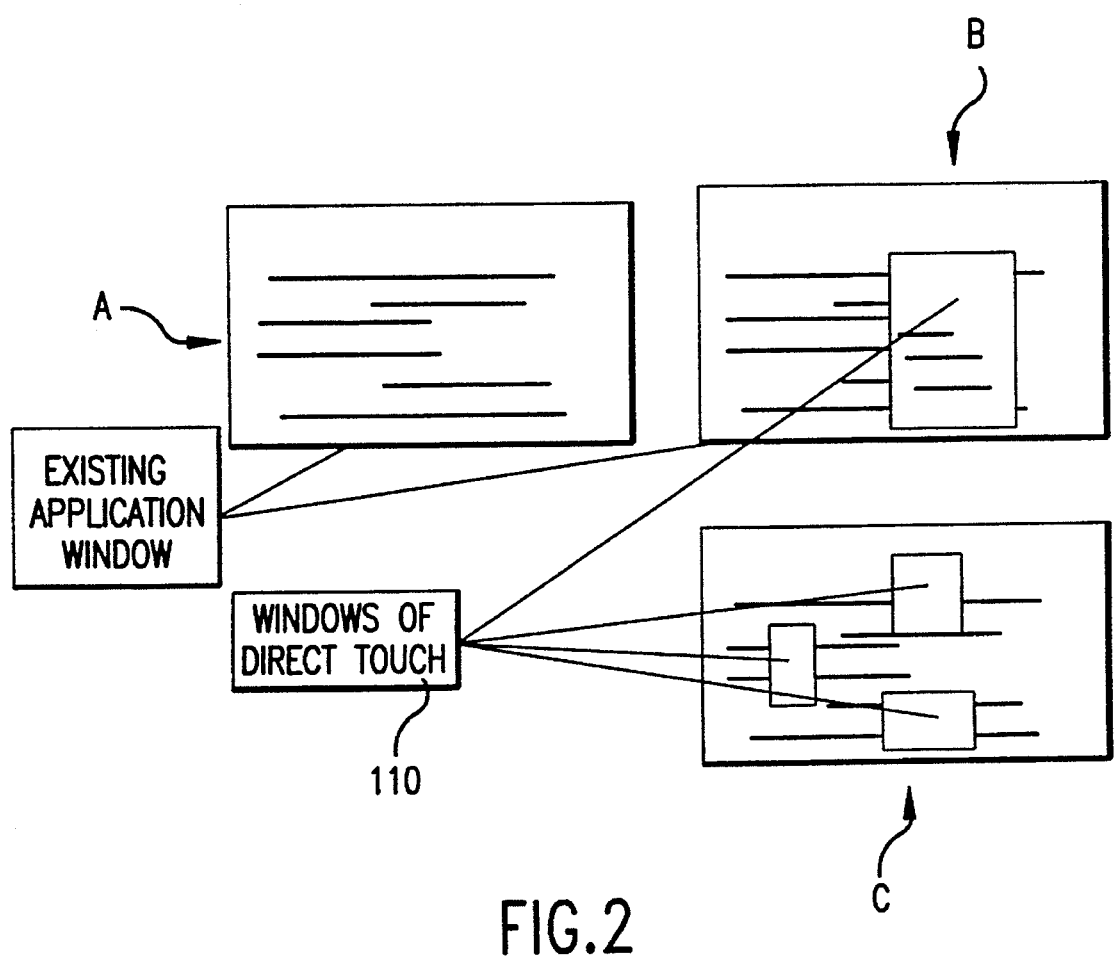
FIG. 2 is a view of three screens, one without inset and two with different types of window inset.
Figure 3:
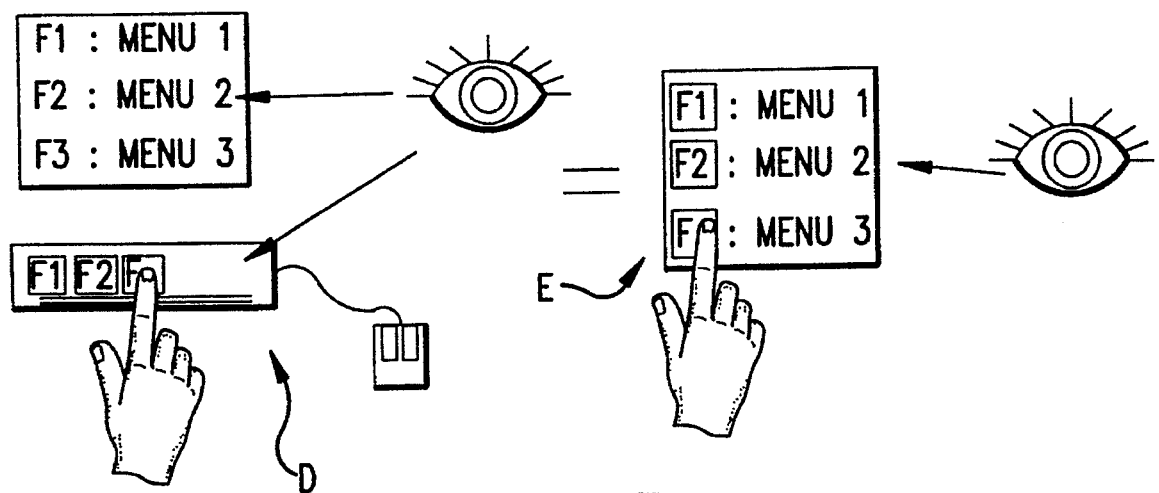
FIG. 3 is a schematic view of a screen without the device then with the device according to the invention.

Thus, as shown in FIG. 2, for a main application executed in a standard manner on the host computer as shown in A. The device can open the windows 110 on the screen of the host computer and define the areas of direct touch, as shown in B and C. The device assigns to each area of the screen thus defined, during the touch on the tactile keyboard, the equivalent of the action of a keystroke or series of keystrokes which will be performed on the keyboard, as shown in FIG. 3. Fig. 3 also illustrates at D, the traditional use of a computing system and at E, the use of the same system with the implementation of the device according to the invention.

The device has memory allowing it to save the associations between the tactile screen areas and, corresponding keystrokes or series of keystrokes. In addition, the device stores the series of associations which occur.

An alternative application would be that one or more of the windows generated by the device include an illustration of the keyboard the device, during the touch on the screen of theses "virtual keys generates" the same series of keystrokes as the host computer keyboard, which would allow for the elmination of an external mechanical keyboard.

What is claimed is:

1. A data display and input control device for simplifying use of a host computer, the data display and input control device connectable to a display terminal and the host computer, the display terminal including a touch sensitive screen, the data display and input control device comprising:

a central processing unit having a RAM and a ROM;

a window position RAM storing window position data;

a window display data RAM storing window display data to be displayed on the display terminal;

a keyboard interface connectable to the keyboard connector of the host computer;

a peripheral circuit coupling the central processing unit to the touch sensitive screen; and an electronic switching device switching in real time data to be displayed by the display terminal between the host computer and the window display data RAM.

2. The data display and input control device according to claim 1, wherein the data display and input control device is inserted into a housing and placed between the host computer and the display terminal.

3. The data display and input control device according to claim 1, wherein the data display and input control device is placed on an electronic card inserted directly into the host computer.

4. The data display and input control device according to claim 1, wherein the data display and input control device is an independent module placed within the host computer.

5. The data display and input control device according to claim 1, wherein the central processing unit transforms a touch on the touch sensitive screen into standard keyboard data to be sent to the host computer.

6. The data display and input control device according to claim 1, wherein the central processing unit generates preprogrammed consecutive series of keystrokes sent to the host computer in response to information from one of the touch sensitive screen and a host computer keyboard.

7. The data display and input control device according to claim 1, wherein the touch sensitive screen covers the display terminal, and the central processing unit links the windows displayed on the display terminal, an output of the touch sensitive screen, and a corresponding series of keystrokes output to the host computer.

8. A data display and input control device for simplifying use of a host computer, the data display and input control device connectable to a display terminal and the host computer, the data display and input control device comprising:

a central processing unit inputting data from the host computer;

a window position memory for storing window position data;

a window data memory for storing window display data; and an electronic switching means for outputting to the display terminal one of a host computer display data and a central processing unit display data by switching in real time between the host computer and the window data memory.

9. The data display and input control device according to claim 8, wherein a touch sensitive screen covers the display terminal so that display contents can be seen through the touch sensitive screen, the touch sensitive screen serving as a data entry device and generating an output corresponding to a location touched by an operator based on the display contents, and the central processing unit receiving the output from the touch sensitive screen.

10. The data display and input control device according to claim 8, wherein a second application running on the host computer concurrently with a main application can interface with the data display and input control device without interfering with the main application.

11. A method for simplifying use of a host computer, wherein a data display and input control device is connected to a host computer and a display terminal, the method comprising:

covering the display terminal with a touch sensitive screen;

interfacing with a second application without interfering with a main application;

generating at least one window to be displayed on the display terminal using the data display and input control device;

switching in real time data to be displayed by the display terminal between the host computer and the data display and input control device;

displaying on the display terminal the at least one generated window so that the at least one window is visible through the touch sensitive screen;

touching the touch sensitive screen at a touched position;

outputting the touched position detected by the touch sensitive screen to a central microprocessing unit;

generating at least one keystroke based on the touched position and the at least one window visible through the touch sensitive screen; and sending to the host computer the at least one keystroke.

* * * * *